Oct. 9, 1956  E. S. TUPPER  2,765,831
FOOD STORER AND DISPENSER
Filed Dec. 23, 1952  2 Sheets-Sheet 1
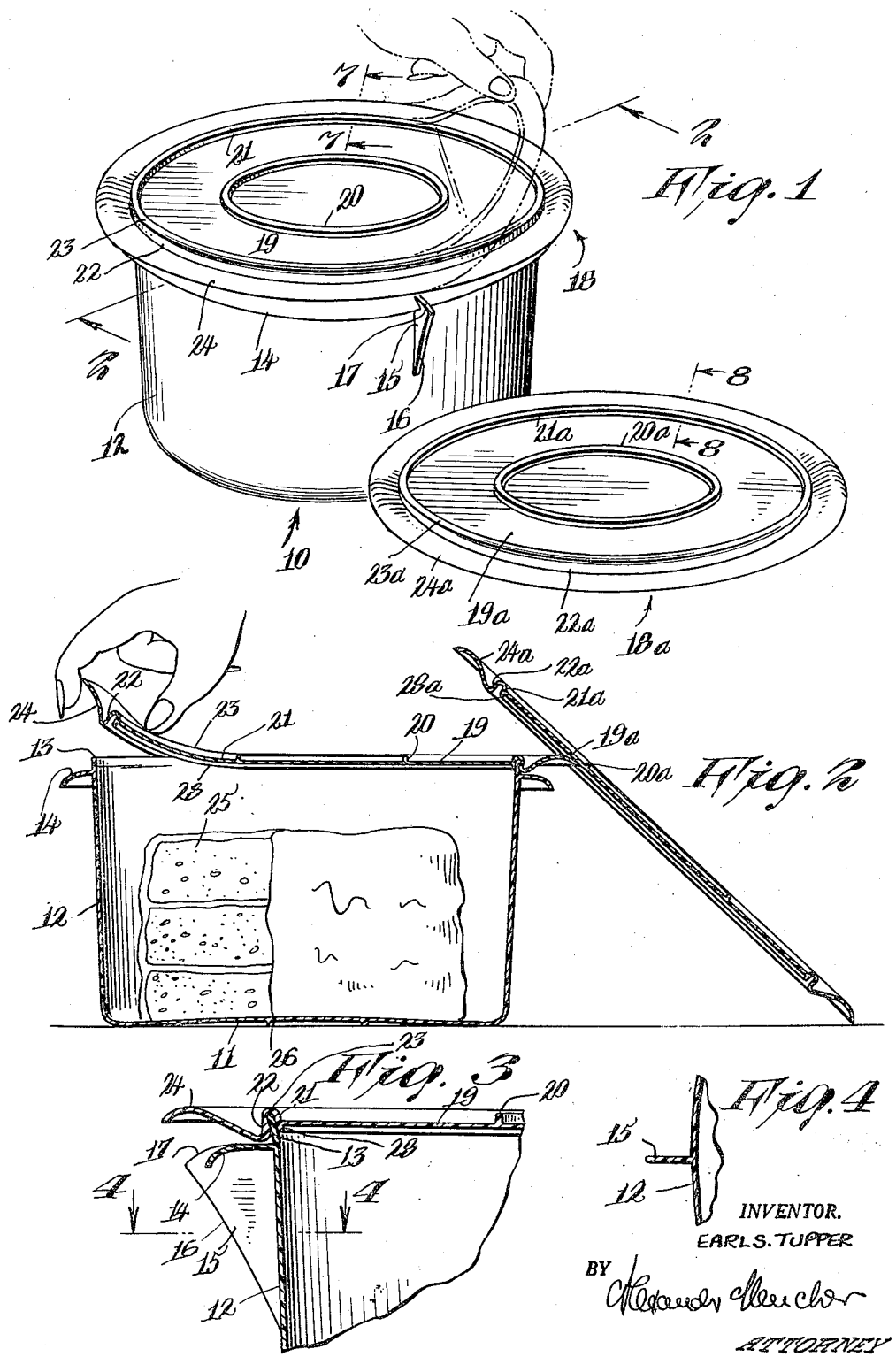
INVENTOR.
EARL S. TUPPER
BY
ATTORNEY Oct. 9, 1956  E. S. TUPPER  2,765,831
FOOD STORER AND DISPENSER
Filed Dec. 23, 1952  2 Sheets-Sheet 2
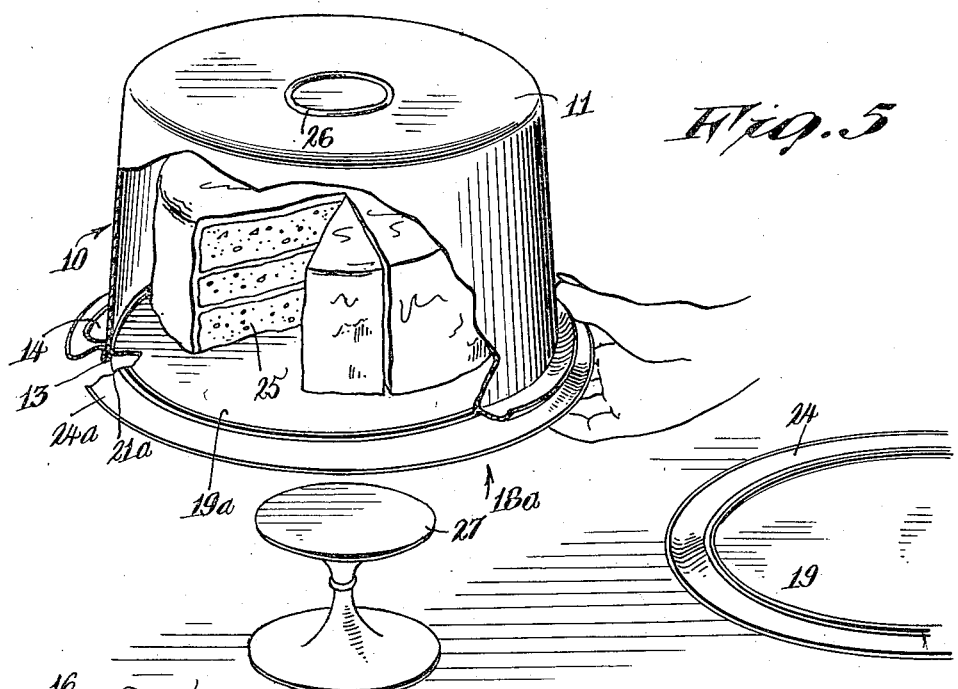
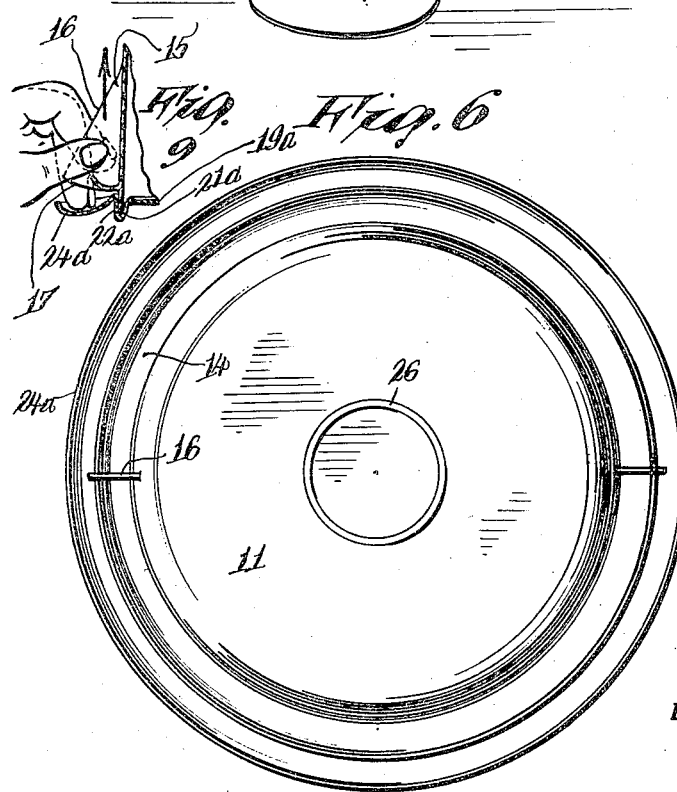
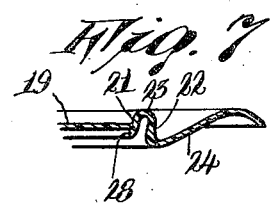
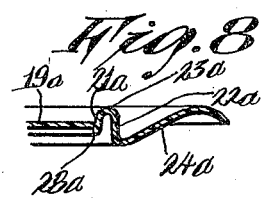
EARL S. TUPPER
INVENTOR.

# United States Patent Office 2,765,831
Patented Oct. 9, 1956

2,765,831

FOOD STORER AND DISPENSER

Earl S. Tupper, Upton, Mass.

Application December 23, 1952, Serial No. 327,476

1 Claim. (Cl. 150—.5)

This invention relates generally to receptacles for storing and dispensing purposes, but more specifically to a vessel having both a relatively stiff or difficulty distortable closure member and another relatively flexible and locally distortable similarly constructed closure member to serve selectively when assembled as a large type of canister and cover or as an inverted jar for content protection and dispensing purposes. When the assembly serves as an inverted jar, the stiff closure member supports the receptacle contents and the receptacle is removable therefrom for dispensing portions from the closure member.

The main object of the invention resides in the provision of a vessel formed of polyethylene or other material having similar characteristics wherein the vessel rim is provided with a peripheral and outwardly extending flange disposed therebelow and having radial web members or tabs secured along the inner edges thereof to the vessel walls for supporting the flange and for serving as removal tabs for the vessel when the assembly forms a dispensing device with the relatively stiff closure member serving as a support for the vessel contents.

A further object of the invention resides in the provision of a combination type of canister and food or cake holder wherein two similarly constructed closure members are provided, one being made of flexible material including polyethylene or other material having similar physical characteristics, and the other being made of a relatively stiff material such as polystyrene or other substance having similar physical characteristics, the polyethylene closure member serving as a cover when the vessel is used as a canister and the polystyrene closure member serving as a support for the vessel contents when the inverted vessel is engaged with the said closure member.

A further object of the invention resides in the provision of a canister and a pair of similarly constructed closure members of different composition as stated and wherein the closure members and the canister are both provided with outwardly flared flanges at the perimeters thereof for easy disassembling, part of the structure herein being shown in U. S. Patent Number 2,487,400 granted to the applicant on November 8, 1949.

Another object of the invention resides in the provision of an inverted type of food jar or storer which is removable from a base for dispensing purposes, both the jar and the base serving as a unit for sealing the contents when not required to be dispensed.

A further object of the invention resides in the provision of a device which is sanitary, durable, easy to clean, efficient in operation and economical in use.

These objects and other incidental ends and advantages of the invention will hereinafter appear in the progress of the disclosure and as pointed out in the appended claim.

Accompanying this specification are drawings showing a preferred form of the invention wherein:

Figure 1 is a view in perspective showing the vessel in the form of a canister both with a flexible and locally distortable cover applied thereto and with a relatively stiff closure member being shown spaced from the vessel; the flexible cover being shown in phantom lines in the process of removal.

Figure 2 is a sectional view of one portion of Figure 1 across the plane 2—2, and of the other portion shown in inclined position and supported on the vessel.

Figure 3 is a fragmentary and sectional view of the upper portion of the device when used as a canister and showing the engagement means between the vessel and the cover.

Figure 4 is a sectional view of Figure 3 across the plane 4—4 thereof.

Figure 5 is a view in perspective partly in section of the vessel in inverted position engaged to the relatively stiff closure member on the bottom, the combination serving as a cake or a food holder; the figure further shows a stand for the combination, and a portion of the locally distortable cover member.

Figure 6 is a plan view of the inverted vessel assembly.

Figure 7 is a partial, sectional and fragmentary view of the flexible and locally distortable closure member.

Figure 8 is a partial, sectional and fragmentary view of the relatively stiff closure member.

Figure 9 is a partial, sectional and fragmentary view illustrating the means of removing the vessel from the relatively stiff closure member at the bottom thereof when the assembly is used as a food storer and dispenser.

In accordance with the invention and the preferred form shown, the vessel generally indicated by numeral 10 is in the form of a canister having a bottom wall 11 and a peripheral side wall 12.

Below and adjacent a rim 13 of side wall 12 is a continuous or peripheral flange 14 shown as being flared outwardly with a downward curve, said flange being provided with reinforcing tabs or depending web members each designated by the numeral 15. The inner edge of each of said tabs is integral with or secured to the outer face of side wall 12 while the opposite free edge 16 as shown tapers inwardly and downwardly from beyond the outer edge of flange 14. The top edge of tab 15 is indicated by numeral 17 and extends beyond the edge of flange 14 as best shown in Figure 3.

Vessel 10 is preferably formed of polyethylene or other material having similar physical characteristics. Vessel 10 has a two-fold function; as a canister member engageable with a cover generally indicated by numeral 18 or as a bell-jar type of cover used in conjunction with a bottom engageable base generally indicated by numeral 18a.

Closure member or cover 18 formed of polyethylene or material having similar physical characteristics, is provided with a central wall 19 having a raised and concentric rib 20 to maintain wall 19 in normally flat condition. Extending off the edge of central wall 19 is a raised grooved rim having an inner wall 21, a spaced outer wall 22 and a top connecting wall 23, the outer wall 22 having an outwardly and upwardly extending and curved flange 24. Flange or skirt as shown extends beyond or overhangs flange 14 as shown best in Figure 3.

The groove defined by walls 21, 22 and 23 is adapted to engage the rim portion 13 of vessel wall 12 whereby a sealing engagement is effectuated in the same manner as set forth in the aforementioned applicant's Patent Number 2,487,400 dated November 8, 1949. Flange 24 of closure 18 and vessel flange 14 are suitably spaced when the parts are assembled so that one finger may be introduced therebetween for removal of the cover as best illustrated in Figure 1.

It is to be noted that the inner dimension or diameter of outer wall 22 is smaller than the outer dimension of rim portion 13 and that the sealing points are at the upper portion of the inner side of wall 22 and the lower side of connecting wall 23 with respect to the outer and top sides of rim portion 13. These sealing points obtain where the outer dimension of inner wall 21 is less than the inner dimension of rim portion 13.

Closure member 18 is removed from rim 13 by a peeling-off type of operation as best indicated in Figure 1; and closure member 18 is applied to vessel 10 in a progressive manner by running the thumb or finger along the groove top wall 23 after segmental engagement with a portion of rim 13. The assembly of vessel 10 and closure 18 is serviceable as a canister of large dimensions wherein vapors or gases will not escape owing to the sealtight engaging means between the parts.

When vessel 10 is used as a cover member to serve the function of an inverted jar for combined storing and dispensing purposes, closure member 18a serves as an engageable base therefor and as a support for food or other contents. Closure member 18a has similar structure as 18 and corresponding parts are indicated by the same numerals bearing a postscript "a."

Closure member 18a may be made of polystyrene or other relatively stiff material having similar physical characteristics and in use is positioned with the central wall 19a facing upwardly as shown in Figure 5. Food or other material required to be alternately stored and dispensed and as indicated by numeral 25 is placed on the inner side of wall 19a and vessel 10 placed thereover so that rim 13 engages the receiving grooved rim indicated by walls 21a, 22a, and 23a in a pinched type of fit.

The tab members 15 have a particular function when vessel 10 is used alternately as a storer and dispenser with closure member 18a for disengagement of the parts. As best shown in Figure 9, tab or tabs 15 are engaged between the thumb and index finger while at the same time the middle finger forces the hollow portion of flange 24a by downward pressure. This operation separates the vessel 10 serving as a cover for the food or other contents resting on member 18a to enable the operator to dispense from member 18a serving as a support. Of course, the assembly may appear on a lunch counter for dispensing cake or cheese and the food may be cut on member 18a. When such use is made, the assembly rests on a pedestal 27 as shown in Figure 5.

It is to be observed that the outside of wall 11 of vessel 10 is concave in formation and is provided with a concentric central rib 26 which serves as a spacer in conjunction with the peripheral edge of bottom wall 11 whereby an insulating air jacket is provided between the bottom of vessel 10 and the supporting surface shown in Fig. 2.

Tab members 15 serve also, as has been before described, in maintaining the vessel flange 14 in flared position with respect to the side wall 12; and although tabs 15 are shown in diametric relationship, they may be applied at any spaced points along the side wall of vessel 10, serving also as handles for canister use.

It is to be noted that the effect of the use of polyethylene or other material having similar physical characteristics for both the vessel 10 and closure 18 is to give the joint between rim 13 and walls 21, 22 and 23 mutually live resistances while the use of polystyrene or material having similar physical characteristics for member 18a gives the joint between rim 13 and walls 21a, 22a and 23a a resilient relationship resulting in good sealing qualities.

Vessel 10 and the closure members 18 and 18a may be molded by compression or injection and the assemblies are particularly suitable for food canisters and for alternate storing and dispensing of food since polyethylene is chemically inert, resilient and locally distortable to enhance sealing characteristics at the joint of the assembly, light in weight, unbreakable, odorless, unaffected by working temperatures, sterile and consequently resistant to mildews, micro-organisms and insects, washable and pleasant to the touch. Moreover, the vessel 10 is capable of being transparent or translucent to fit requirements.

I wish it understood that minor changes and variations in the location, integration, material and size and shape of parts may all be resorted to without departing from the spirit of the invention and the scope of the appended claim.

I claim:

In a combination canister and closure, an open-mouthed plastic container having a peripheral flange on the side wall thereof and spaced below the container rim, a plurality of spaced radial web members projecting from the outer face of the container side wall and extending upwardly and joined with and adapted to reinforce said flange, a closure member of deformable and resilient plastic material having the physical characteristics of polyethylene, said closure member being removably engageable with the rim of the container and comprising a central wall and an upwardly extending peripheral groove engageable with said rim and having an inner, an outer and a top connecting wall, the outer wall having a peripheral skirt extending upwardly from the bottom thereof beyond and in diverging relationship with said flange to enable separation of said closure member from the container by finger operation, the lateral dimension of the inner face of the groove outer wall being slightly less than the lateral dimension of the rim outer face.

References Cited in the file of this patent

UNITED STATES PATENTS

| | | |
|---|---|---|
| 1,387,520 | Thomas | Aug. 16, 1921 |
| 1,972,895 | Maccoy | Sept. 11, 1934 |
| 2,223,695 | Mayfield | Dec. 3, 1940 |
| 2,289,913 | Joor | July 14, 1942 |
| 2,376,263 | Marner | May 15, 1945 |
| 2,487,400 | Tupper | Nov. 8, 1949 |
| 2,606,586 | Hill | Aug. 12, 1952 |
| 2,695,645 | Tupper | Nov. 30, 1954 |